(12) United States Patent
Lin

(10) Patent No.: US 10,459,179 B2
(45) Date of Patent: Oct. 29, 2019

(54) OPTICAL TRANSCEIVER AND OPTICAL LENS THEREOF

(71) Applicant: Prime World International Holdings Ltd., New Taipei (TW)

(72) Inventor: Huan-Yu Lin, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 0 days.

(21) Appl. No.: 15/724,621

(22) Filed: Oct. 4, 2017

(65) Prior Publication Data

US 2019/0101713 A1  Apr. 4, 2019

(51) Int. Cl.
  *G02B 6/42* (2006.01)
(52) U.S. Cl.
  CPC ......... *G02B 6/4244* (2013.01); *G02B 6/4214* (2013.01); *G02B 6/4206* (2013.01); *G02B 6/428* (2013.01); *G02B 6/4239* (2013.01); *G02B 6/4284* (2013.01); *G02B 6/4292* (2013.01)

(58) Field of Classification Search
  CPC .................................................. G02B 6/4239
  See application file for complete search history.

(56) References Cited

U.S. PATENT DOCUMENTS

| 5,117,476 A | 5/1992 | Yingst et al. |
| 6,623,173 B1 | 9/2003 | Grois et al. |
| 6,945,712 B1 | 9/2005 | Conn |
| 7,108,432 B2 | 9/2006 | Nagasaka |
| 7,419,312 B2 | 9/2008 | Nagasaka |
| 8,676,006 B2 | 3/2014 | Morioka |
| 8,787,714 B2 | 7/2014 | Morioka |
| 8,939,657 B2 | 1/2015 | Hung |
| 9,035,234 B2 | 5/2015 | Wu |
| 9,063,281 B2 | 6/2015 | Lin |
| 9,134,487 B2 | 9/2015 | Chang et al. |
| 9,377,594 B2 | 6/2016 | Liff et al. |
| 2004/0202477 A1 | 10/2004 | Nagasaka et al. |
| 2005/0238294 A1 | 10/2005 | Nagasaka et al. |
| 2006/0164738 A1 | 7/2006 | Yamamoto et al. |
| 2011/0293221 A1 | 12/2011 | Kaneshiro et al. |
| 2013/0266260 A1* | 10/2013 | Morioka ............... G02B 6/4214 385/33 |
| 2014/0064662 A1* | 3/2014 | Ootorii ................... G02B 6/26 385/33 |

(Continued)

OTHER PUBLICATIONS

U.S. Office Action dated Jan. 12, 2018, received in related U.S. Appl. No. 15/722,279, 9 pgs.

(Continued)

*Primary Examiner* — Sung H Pak
(74) *Attorney, Agent, or Firm* — Grossman Tucker Perreault & Pfleger, PLLC

(57) ABSTRACT

An optical transceiver includes a substrate, a transceiver module, an optical lens and an adhesive. The transceiver module is disposed on an outer surface of the substrate. The optical lens is disposed on the outer surface for guiding light to the transceiver module. The optical lens defines a contact surface and at least one hole. The contact surface faces the outer surface, and an opening of the hole is located on the contact surface. The adhesive is accommodated into the hole from the opening, and the contact surface of the optical lens is adhered to the outer surface of the substrate by an adhesive.

17 Claims, 6 Drawing Sheets

(56) References Cited

U.S. PATENT DOCUMENTS

| | | | | |
|---|---|---|---|---|
| 2014/0151536 A1* | 6/2014 | Wu | ............................ | H01L 31/12 |
| | | | | 250/216 |
| 2014/0185995 A1* | 7/2014 | Lee | ........................ | G02B 6/4239 |
| | | | | 385/93 |
| 2017/0090125 A1 | 3/2017 | Kurashima et al. | | |
| 2017/0219786 A1* | 8/2017 | Morioka | ............... | G02B 6/4239 |
| 2018/0011265 A1* | 1/2018 | Kon | ........................ | G02B 6/4214 |

OTHER PUBLICATIONS

U.S. Office Action dated Apr. 9, 2018, received in related U.S. Appl. No. 15/791,987, 11 pgs.

* cited by examiner

OPTICAL TRANSCEIVER AND OPTICAL LENS THEREOF

TECHNICAL FIELD

The present disclosure relates to an optical transceiver, more particularly to an optical transceiver including an optical lens.

BACKGROUND

Optical transceivers are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. In order to define the electrical-to-mechanical interface of the optical transceiver and the corresponding cage, different specifications have been provided such as XFP (10 Gigabit Small Form Factor Pluggable) used in 10 GB/s communication rate and QSFP (Quad Small Form-factor Pluggable).

In the optical transceiver, an optical lens is configured for guiding light to active components such as photodiodes. Generally, the optical lens is attached to a substrate where the active components are mounted.

SUMMARY

According to one aspect of the present disclosure, an optical transceiver includes a substrate, a transceiver module, and an optical lens. The transceiver module is disposed on an outer surface of the substrate. The optical lens is disposed on the outer surface for guiding light to the transceiver module. The optical lens has a contact surface facing the outer surface and arranges a hole with an opening of the hole connecting to the contact surface. An adhesive fully or partially fills in the hole to allow for the contact surface of the optical lens to be adhered to the outer surface of the substrate by the adhesive.

According to another aspect of the present disclosure, an optical lens of an optical transceiver, adhered to a substrate of the optical transceiver by an adhesive for guiding light to a transceiver module of the optical transceiver, includes a contact surface adhered to the substrate and a hole for the adhesive to be fully or partially filled, with an opening of the hole connecting to the contact surface.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1A:
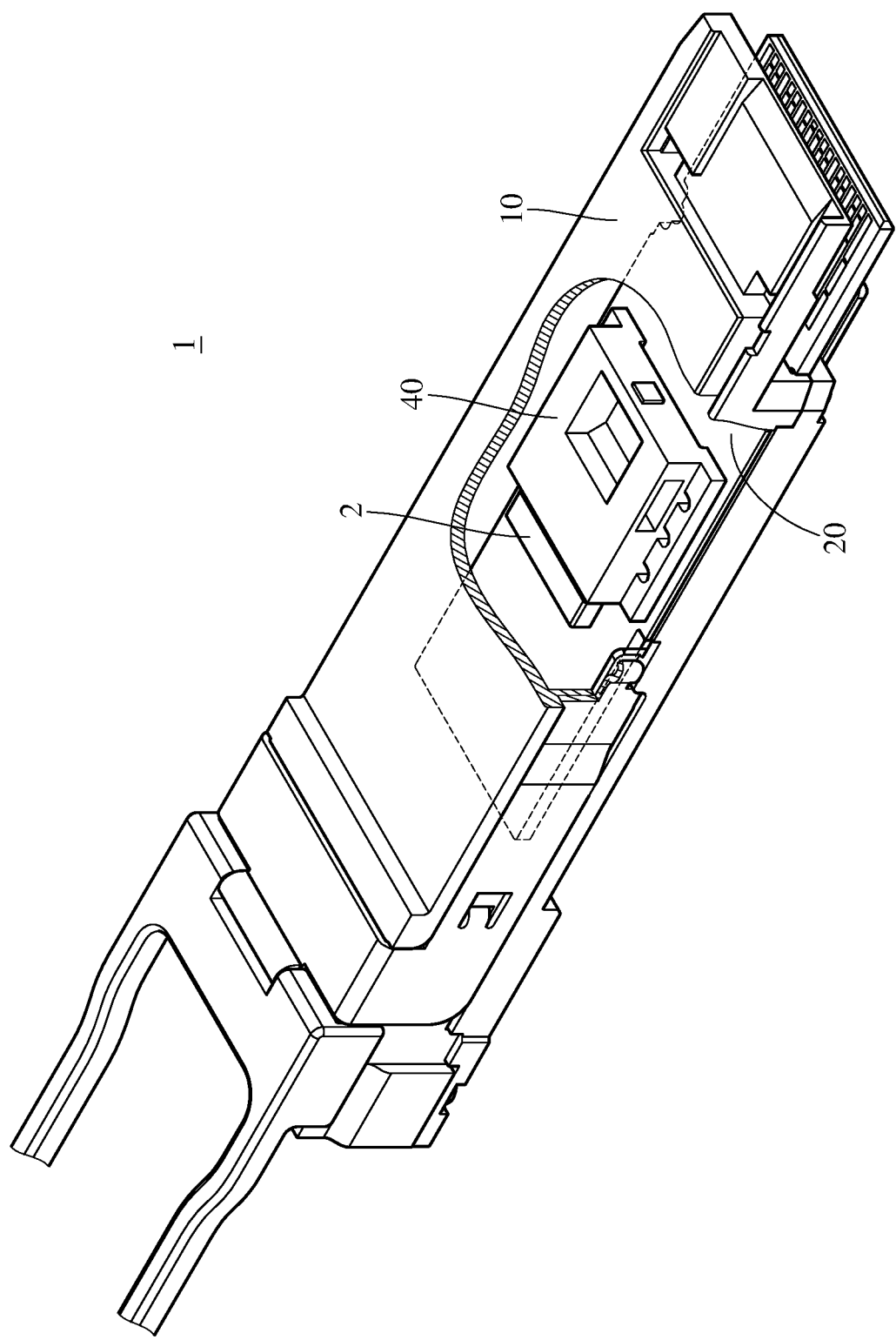
FIG. 1A is a perspective view of an optical transceiver according to a first embodiment of the present disclosure.
Figure 1B:
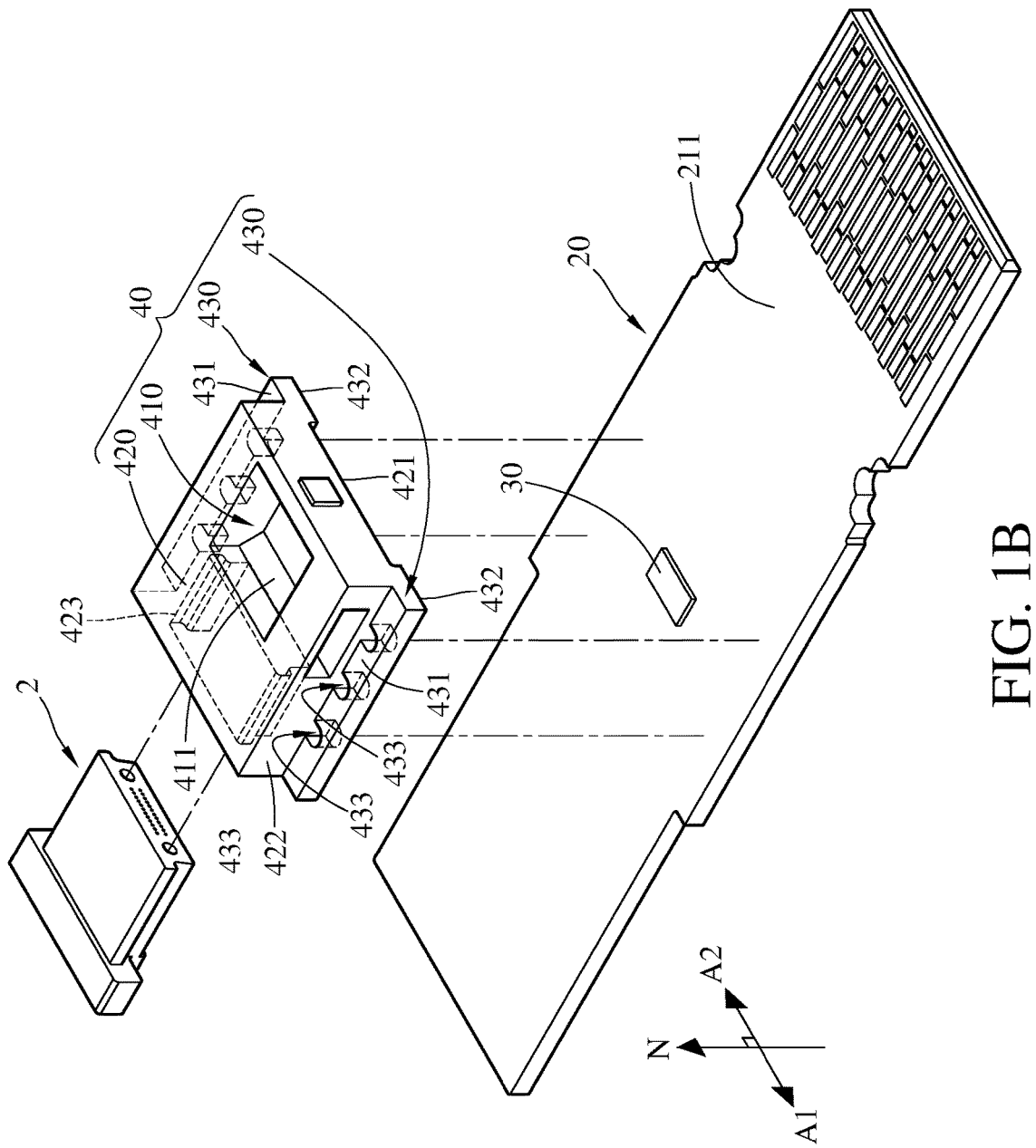
FIG. 1B is an exploded view of the optical transceiver in FIG. 1A without adhesive.
Figure 1C:
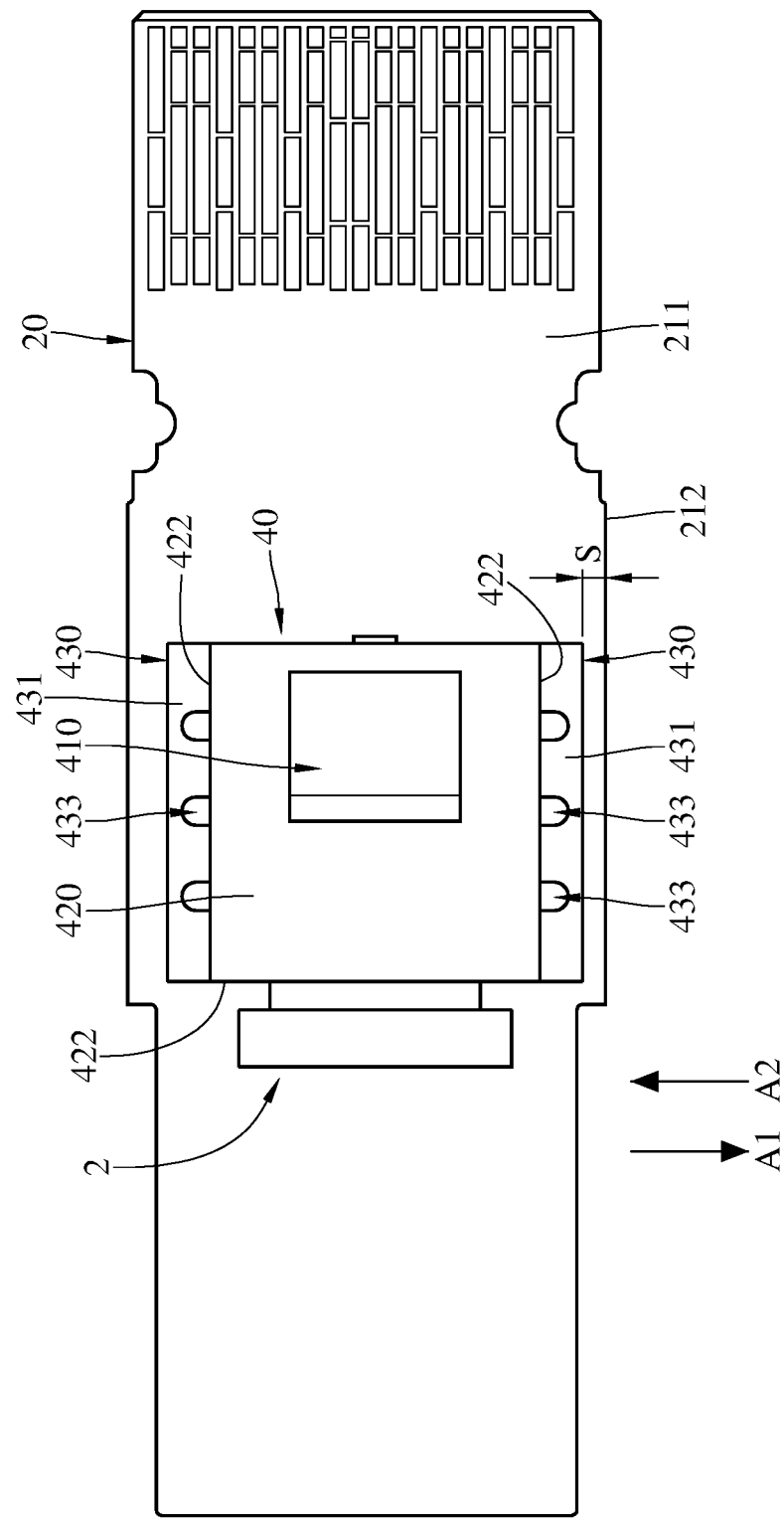
FIG. 1C is a top view of the optical transceiver in FIG. 1A without adhesive.
Figure 1D:
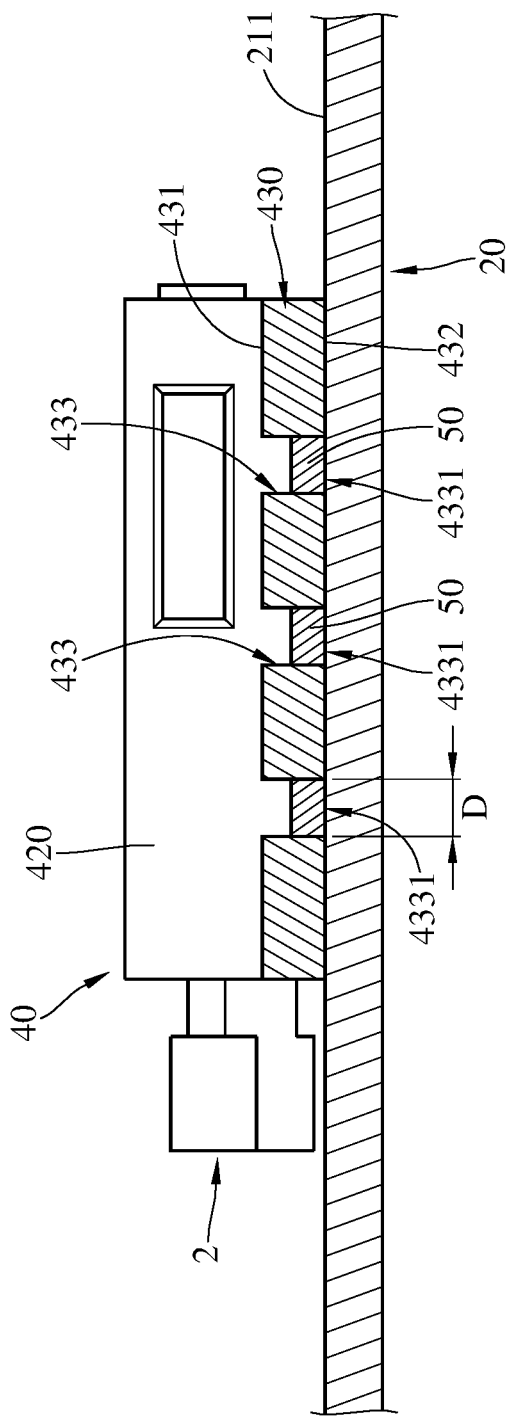
FIG. 1D is a cross-sectional view of the optical transceiver in FIG. 1C with adhesive.
Figure 1E:
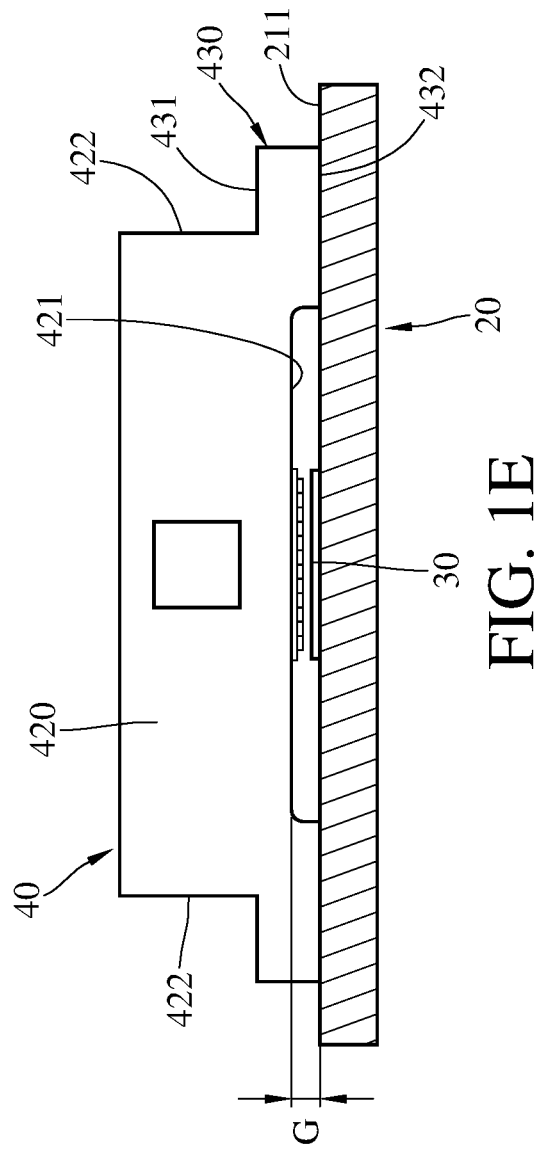
FIG. 1E is a side view of the optical transceiver in FIG. 1D.

Please refer to FIG. 1A through FIG. 1E. FIG. 1A is a perspective view of an optical transceiver according to a first embodiment of the present disclosure. FIG. 1B is an exploded view of the optical transceiver in FIG. 1A without adhesive. FIG. 1C is a top view of the optical transceiver in FIG. 1A without adhesive. FIG. 1D is a cross-sectional view of the optical transceiver in FIG. 1C with adhesive. FIG. 1E is a side view of the optical transceiver in FIG. 1D. In this embodiment, an optical transceiver 1 is disclosed, and the optical transceiver 1 includes a case 10, a substrate 20, a transceiver module 30, an optical lens 40 and an adhesive 50.

The case 10, for example, is made of metal. There is an optical connector disposed on an end of the case 10 for coupling optical fibers (not shown) to the optical transceiver 1. For the purpose of illustration, the case 10 is omitted in FIG. 1B through FIG. 1E.

The substrate 20, for example, is a circuit board or a package substrate disposed within the case 10. The transceiver module 30 is disposed on an outer surface 211 of the substrate 20. In this embodiment, the transceiver module 30 includes multiple electronic components and multiple active components which are physically separated from each other. Each electronic component, for example, could be an IC (integrated circuit) chip. For a pair of two electronic components, one of the two electronic components is a driver IC chip, and the other electronic component is an amplifier IC chip. It is worth noting that the number of the electronic components in the present disclosure is not limited by the above. Each active component, for example, could be a laser diode, a light emitting diode, a P-I-N photodiode or an avalanche photodiode. For a pair of two active components, one of the two active components is a laser diode coupled to the driver IC chip, and the other active component is a P-I-N photodiode coupled to the amplifier IC chip. As with the number of the electronic components, the number of the active components is not limited in view of this paragraph.

The optical lens 40 is disposed on the outer surface 211 for guiding light to the active components of the transceiver module 30. In detail, the optical lens 40 includes a reflecting portion 410, a covering portion 420 and two contacting portions 430. The reflecting portion 410 is disposed on the covering portion 420. One or more materials of high reflectivity, such as silver or gold, may be coated on a reflecting surface 411 of the reflecting portion 410. When the light traveling in the optical transceiver 1 is incident on the reflecting surface 411, the light is reflected by the reflecting surface 411 and directed to the transceiver module 30 (e.g., the P-I-N photodiode). Also, when another light is emitted from the transceiver module 30 (e.g., the laser diode), such light is reflected by the reflecting surface 411 and guided to the optical fibers.

The covering portion 420 defines a bottom surface 421 and a lateral surface 422. The bottom surface 421 faces the outer surface 211 of the substrate 20, and the bottom surface 421 is spaced apart from the outer surface 211. A gap space G may exist between the bottom surface 421 and the outer surface 211. The transceiver module 30 is disposed in the gap space G, so that the transceiver module 30 could be underlying the covering portion 420. Furthermore, the covering portion 420 further defines a groove 423 located on the lateral surface 422, and a ferrule 2 may be accommodated within the groove 423 so as to couple the optical fibers, such as a fiber pigtail, to the transceiver module 30.

The two contacting portions 430 are disposed on the covering portion 420. The covering portion 420 and the contacting portions 430 are integral with each other in this embodiment, but the disclosure is not limited thereto. In detail, each of the two contacting portions 430 protrudes from the lateral surface 422 along an extending direction A1 or A2. In this embodiment, both the extending directions A1 and A2 is orthogonal to the normal direction N of the outer surface 211 of the substrate 20. Each contacting portion 430 may define a top surface 431, a contact surface 432 and a plurality of holes 433. The contact surface 432 faces the outer surface 211 of the substrate 20. Each hole 433 may extend through the contacting portion 430 of the optical lens 40, and two ends of the hole 433 are respectively located on the top surface 431 and the contact surface 432. The hole 433 may have an opening 4331 connecting to the contact surface 432.

The adhesive 50, for example, is epoxy resin, UV glue or instant glue. The adhesive 50 may be flown into each hole 433 from the opening 4331, so that the contact surface 432 of the optical lens 40 could be adhered to the outer surface 211 of the substrate 20. In this embodiment, a method for attaching the optical lens 40 to the substrate 20 includes two steps. The adhesive 50 is firstly spread on the outer surface 211 of the substrate 20. Then, the optical lens 40 is attached to the outer surface 211 with the contact surface 432 at a region where the adhesive 50 is located. Due to capillary action, some adhesive 50 flows into the holes 433 through the openings 4331. The surface tension between the adhesive 50 and the inner wall of each hole 433 may serve to maintain the adhesive 50 in the holes 433.

In order to enhance the capability of shear strength for the optical lens 40, increasing the number of the holes 433 may be one feasible option. According to the present disclosure, when extra holes 433 on the contacting portion 430 of the optical lens 40 are placed, the adhesive 50 in sufficient amount of volume could partially or fully fills into some or even all of the holes 433, which may result in enhanced contact between the optical lens 40 and the substrate 20.

In this embodiment, each hole 433 extends through the contacting portion 430 of the optical lens 40, and two ends of the hole 433 respectively connect to the top surface 431 and the contact surface 432. Therefore, when the adhesive 50 flows into the holes 433, the air in the hole 433 may be evacuated through the end of the hole 433 on the top surface 431, allowing for the adhesive 50 to reach to certain height or even occupy the entire opening 4331 of the hole 433.

Size of the hole 433 may help enhancing the contact between the optical lens 40 and the substrate 20. As shown in FIG. 1D, the diameter D of each hole 433 may range from 0.5 millimeters (mm) to 2.0 mm. The diameter D is 1.2 mm in this embodiment. When the diameter D is less than 0.5 mm, the adhesive 50, with higher viscosity, is difficult to flow into the hole 433. When the diameter D is greater than 2.0 mm, the capillary action is overly weak such that the adhesive 50 may not reach to the certain height of the opening 4331.

Moreover, as shown in FIG. 1C, in this embodiment, there is a distance S between the contacting portion 430 of the optical lens 40 and an edge 212 of the substrate 20. Therefore, a region on the substrate 20 for placement of electronic components and printed circuits may be provided.

Further, in this embodiment, both the covering portion 420 and the contacting portion 430 of the optical lens 40 are made of light penetrable material. In some embodiments, the optical lens 40 is made of light penetrable material.

Figure 2:
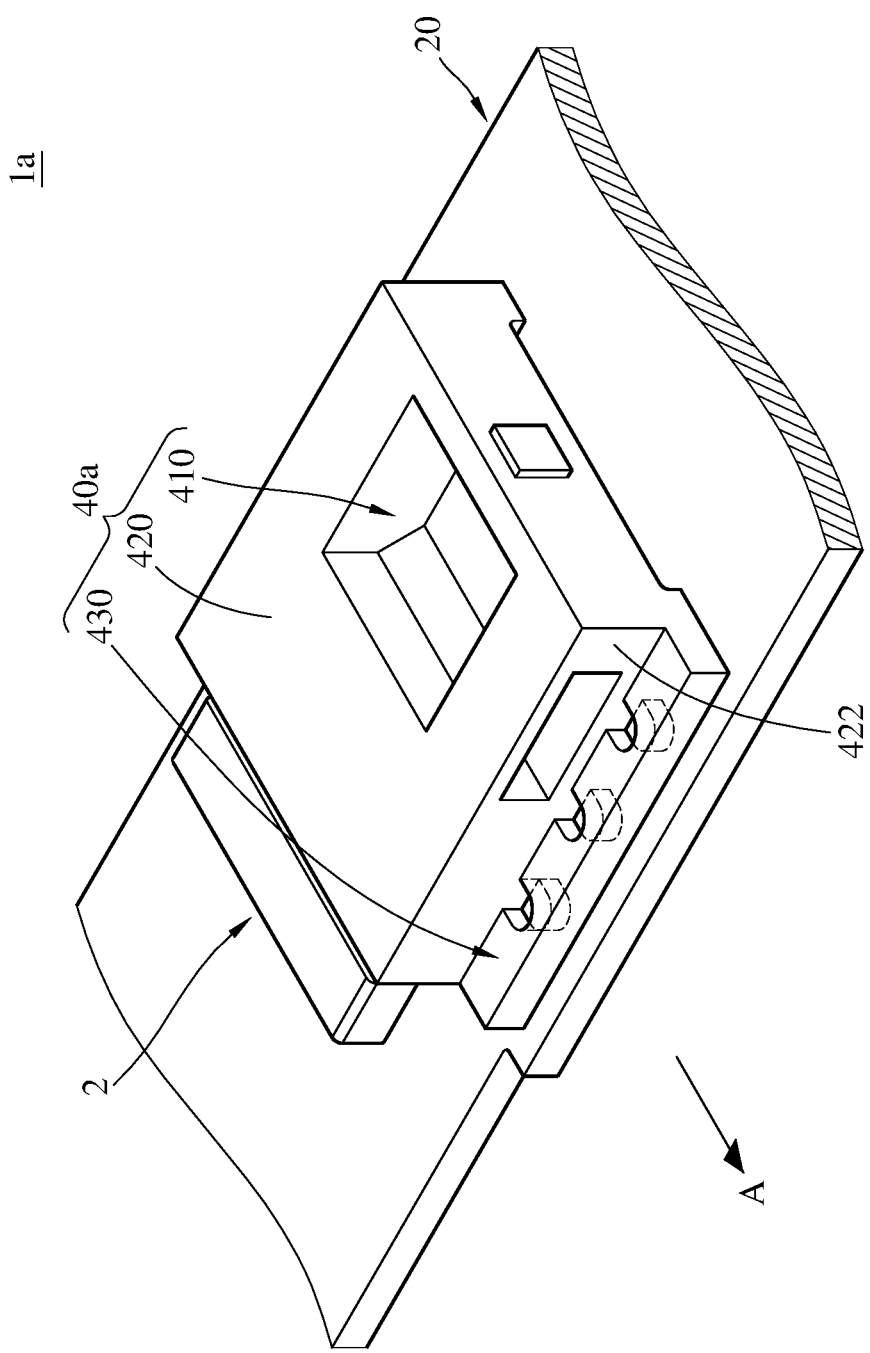
FIG. 2 is a perspective view of an optical transceiver according to a second embodiment of the present disclosure.

FIG. 2 is a perspective view of an optical transceiver according to a second embodiment of the present disclosure.

In this embodiment, an optical transceiver 1a is disclosed, and the optical transceiver 1a includes an optical lens 40a. The optical lens 40a includes only one contacting portion 430, and the contacting portion 430 protrudes from the lateral surface 422 of the covering portion 420 along the extending direction A. Other configuration of the optical transceiver 1a may be similar to its counterpart in FIG. 1.

Figure 3:
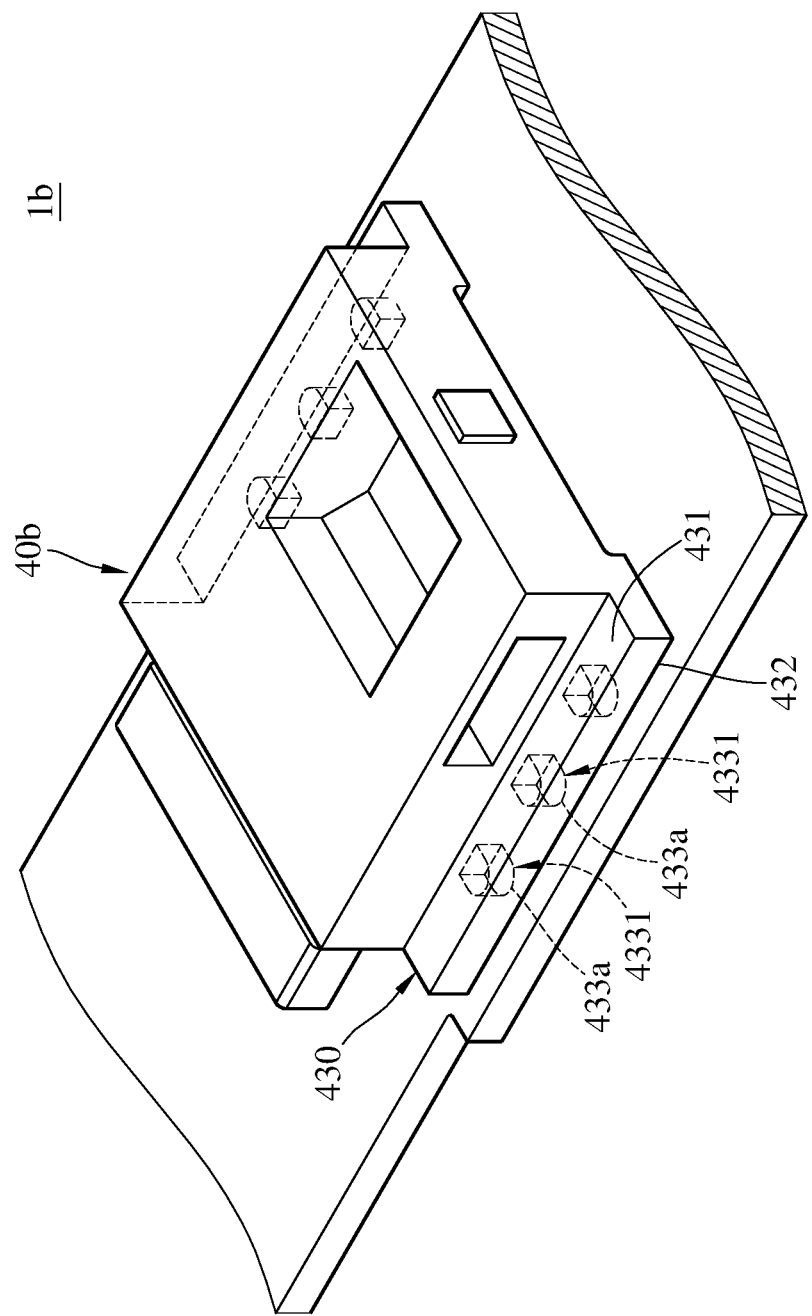
FIG. 3 is a perspective view of an optical transceiver according to a third embodiment of the present disclosure.

FIG. 3 is a perspective view of an optical transceiver according to a third embodiment of the present disclosure.

In this embodiment, an optical transceiver 1b is disclosed, and the optical transceiver 1b includes an optical lens 40b. Each contacting portion 430 of the optical lens 40b may include a plurality of holes 433a. The holes 433a may not necessarily extend through the contacting portion 430. In other words, an opening end of each hole 433a may connect to the contact surface 432, without any opening formed on the top surface 431. That is, the depth of each hole 433a is smaller than the thickness of the contacting portion 430 from the top surface 431 to the contact surface 432.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. An optical transceiver, comprising:
   a substrate;
   a transceiver module disposed on an outer surface of the substrate; and
   an optical lens disposed on the outer surface for guiding light to the transceiver module, and the optical lens having a contact surface facing the outer surface and arranging a hole with an opening of the hole connecting to the contact surface, wherein the optical lens includes a covering portion that defines a groove, the groove to accommodate a ferrule to couple an associated optical fiber to the transceiver module;
   wherein an adhesive fully or partially fills in the hole allowing for the contact surface of the optical lens to be adhered to the outer surface of the substrate by the adhesive.

2. The optical transceiver according to claim 1, wherein a top surface of the optical lens is opposite to the contact surface, the hole of the optical lens extends through the optical lens, and two ends of the hole respectively connect to the top surface and the contact surface.

3. The optical transceiver according to claim 1, wherein a diameter of the hole is from 0.5 mm to 2.0 mm.

4. The optical transceiver according to claim 1, wherein the optical lens comprises a reflecting portion, the covering portion with a lateral surface defining the groove, and a contacting portion protruding from the lateral surface with the contacting portion defining the contact surface and the hole.

5. The optical transceiver according to claim 4, wherein the optical lens further comprises another contacting portion protruding from another lateral surface of the covering portion.

6. The optical transceiver according to claim 4, wherein the contacting portion protrudes from the lateral surface along an extending direction, and the extending direction is orthogonal to a normal direction of the outer surface of the substrate.

7. The optical transceiver according to claim 4, wherein there is a distance between the contacting portion and an edge of the substrate.

8. The optical transceiver according to claim 4, wherein both the covering portion and the contacting portion are made of light penetrable material.

9. The optical transceiver according to claim 4, wherein a bottom surface of the covering portion faces the outer surface of the substrate, and a gap space exists between the bottom surface and the outer surface of the substrate.

10. An optical transceiver, the optical transceiver comprising:
a substrate;
an optical lens adhered to the substrate of the optical transceiver by an adhesive, the optical lens for guiding light to a transceiver module of the optical transceiver, wherein the optical lens comprises a contact surface adhered to the substrate, a covering portion that defines a groove for accommodating a ferrule, and a hole for the adhesive to be fully or partially filled, with an opening of the hole connecting to the contact surface.

11. The optical lens according to claim 10, wherein a top surface of the optical lens is opposite to the contact surface, the hole of the optical lens extends through the optical lens, and two ends of the hole respectively connect to the top surface and the contact surface.

12. The optical lens according to claim 10, wherein a diameter of the hole is from 0.5 mm to 2.0 mm.

13. The optical lens according to claim 10, wherein the optical lens comprises a reflecting portion, the covering portion having a lateral surface defining the groove, and a contacting portion protruding from the lateral surface, the contacting portion defines the contact surface and the hole.

14. The optical lens according to claim 13, wherein the optical lens further comprises another contacting portion protruding from another side of the covering portion.

15. The optical lens according to claim 13, wherein the contacting portion protrudes from the lateral surface along an extending direction, and the extending direction is parallel to a normal direction of the lateral surface.

16. The optical lens according to claim 13, wherein both the covering portion and the contacting portion are made of light penetrable material.

17. The optical transceiver according to claim 1, wherein the hole is surrounded along its length and is configured to cause the adhesive to at least partially fill the hole based on capillary action.

* * * * *